(No Model.)
J. C. CAYTON.
PLANTER.
No. 488,239. Patented Dec. 20, 1892.
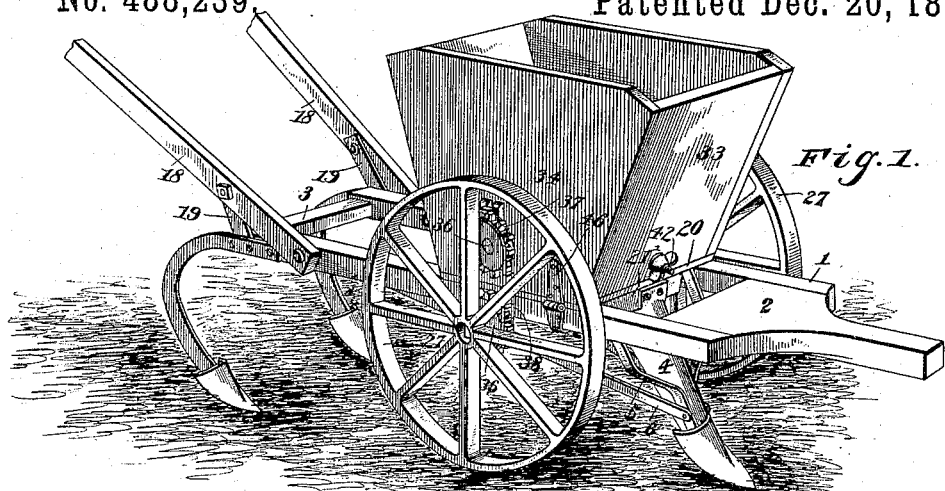
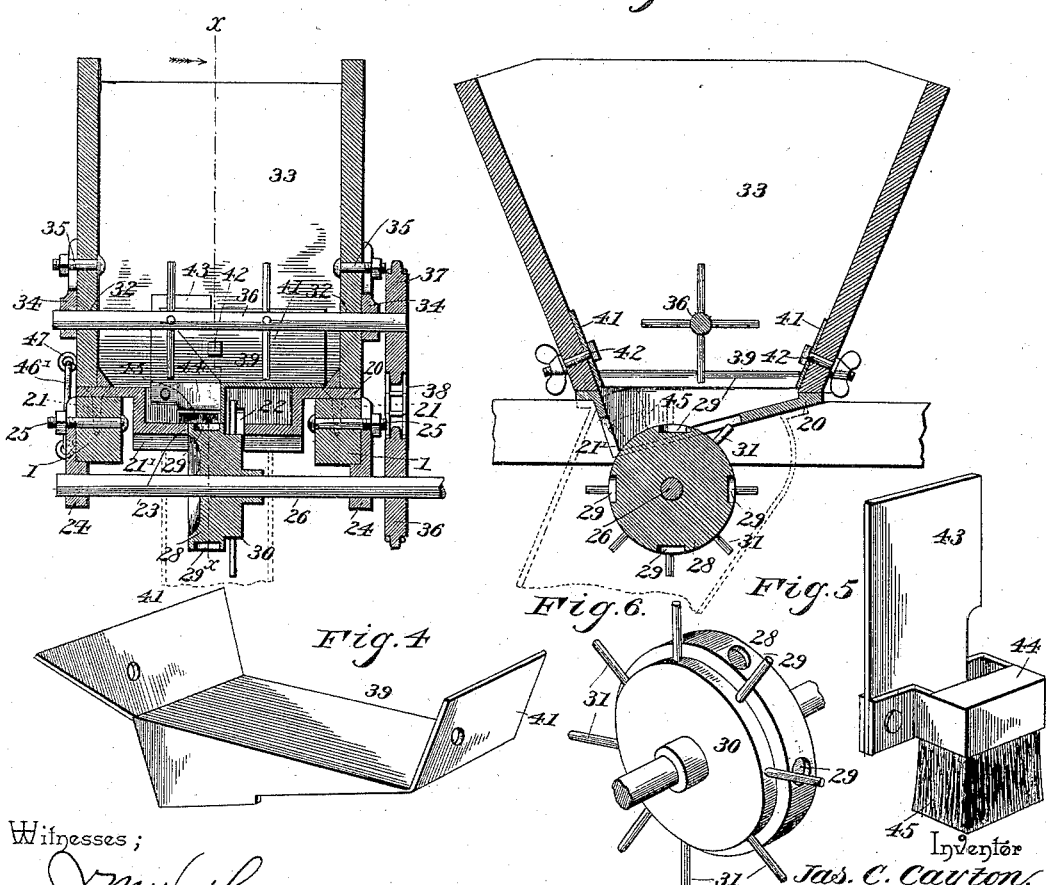
Witnesses;
Inventor
Jas. C. Cayton,
By his Attorneys,
C. A. Snow & Co.

UNITED STATES PATENT OFFICE.

JAMES C. CAYTON, OF THORNTON, TEXAS.

PLANTER.

SPECIFICATION forming part of Letters Patent No. 488,239, dated December 20, 1892.

Application filed July 30, 1892. Serial No. 441,733. (No model.)

*To all whom it may concern:*

Be it known that I, JAMES C. CAYTON, a citizen of the United States, residing at Thornton, in the county of Limestone and State of Texas, have invented a new and useful Planter, of which the following is a specification.

My invention relates to improvements in planters, and has particular reference to improvements upon United States patent granted me March 10, 1891, and bearing No. 447,758.

The objects of my present improvements are to provide a hopper adapted to be employed for planting corn or other cereals or cotton.

A further object is to provide means whereby the said hopper may be readily converted from a corn or cereal planter to a cotton planter.

Other objects and advantages of the invention will appear in the following description, and the novel features thereof will be particularly pointed out in the claims.

Referring to the drawings, Figure 1 is a perspective view of a planter constructed in accordance with my invention. Fig. 2 is a transverse section through the hopper. Fig. 3 is a longitudinal section through the hopper. Fig. 4 is a detail in perspective of the reversible angular partition or bottom. Fig. 5 is a perspective of the brush. Fig. 6 is a perspective of the feed wheel or disk.

Like numerals of reference indicate like parts in all the figures of the drawings.

As in the previous instance, the frame of the planter is composed of the side-beams 1, 1, between the front ends of which is bolted a rear end of the tongue 2, which is of sufficient width to properly space the bars apart. The rear ends of the side-beams are spaced by means of a cross-bar 3. A rectangular cast-metal plate 20 is secured by screws 21 to the side-beams 1, and said rectangular plate between the beams is provided with a countersunk depression 21', which depression is provided at one side of its longitudinal center with a slot 22, at the front end of which, and communicating therewith, an opening 23 is formed, which opening extends to the opposite side of said longitudinal center.

A pair of slotted bearing-hangers 24 are secured by bolts 25 to the beams 1, and in said bearing-hangers, and extending transversely under the beams 1, there is mounted for rotation a transverse shaft 23. This shaft 26 also constitutes the axle of the machine, and beyond its bearing-hangers above mentioned the ground-wheels 27 are mounted. Between its bearing-hangers the shaft has mounted thereon a cast-metal wheel 28, and said wheel has its periphery provided with countersunk seed-cups 29. The periphery of the wheel extending up into the opening 23, formed in the cast-metal bottom. At one side of the periphery a reduced angular hub 30 is formed, and from this hub radiates a series of spokes or arms 31, which travel in the narrow slot 22 of the cast-metal bottom.

32 designates bearing-openings formed in the side walls of the hopper 33, and slotted bearing-castings 34 are, by bolts 35, connected adjustably to the side-walls. An agitator-shaft 36 is journaled in the bearings of the castings, and agitating-arms radiate from it within the hopper. The outer end of the shaft carries a sprocket-wheel 37, and the same is engaged with and operated by an endless sprocket-chain 38, which passes over the sprocket-wheel 36, mounted upon the axle or shaft that passes under the beams 1.

39 designates a sheet-metal reversible half-bottom for the hopper. And said bottom, in transverse section, is of inverted L-shape, in that it is provided at its inner edge, which occurs at the center of the hopper, with a depending flange. The ends of the reversible half-bottom are upturned at 41, and are connected by bolts 42, to the front and rear walls of the hopper. The flange that depends from the inner edge of the reversible half-bottom has its lower edge inclined in order that it may conform to the inclination of the cast-metal bottom. It will be seen that by arranging this reversible half-bottom at one side of the hopper, it will cover the spokes of the feed-wheel and expose that portion of the feed-wheel having the seed-cups, and that by reversing the position of said half-bottom the same will cover that portion of the feed-wheel having the seed-cups and will expose that portion of the feed-wheel having the radiating spokes or arms. A plate 43 is perforated so as to receive the front bolt of the pair that is employed to secure the half-bottom in position in the hopper, and is provided at its lower end with a socket 44, which retains a brush 45, the bristles of which depend and rest upon the periphery of the cup-portion of the seed-disk and constitute a brush cut-off.

The hopper is preferably connected to one of the side bars by a hinge 46, and at its opposite side to the opposite side bar by a hook 46', engaging with an eye 47, projecting from the same, whereby the hopper may be swung to one side to expose the cast-metal bottom and its own interior. To the front of the hopper is secured the upper end of a seed-spout or chute 4, whose lower end terminates in rear of a furrow-opening shovel secured to the lower ends of a pair of converging depending shovel-standards 5, the upper ends being secured to the opposite side-bars 1. Diagonal braces 6 have their front ends bolted to the standards and their rear ends connected to those bolts that secure the handles to the bars 1.

The operation of the planter will be readily understood from the foregoing description, and it will simply be necessary to state that by arranging the half-bottom at one side of the hopper, it will cover the seed-cups and expose the spokes or arms, so that cotton seed can be fed through the slot 22 of the cast-metal bottom, and by reversing the position of the half-bottom and locating it at the opposite side of the hopper, it will cover the spokes or arms of the feed-wheel or disk and expose the cups, so that corn or other seed may be fed from the hopper through the opening 23.

Having described my invention, what I claim is:

1. The combination with the framework, the bottom mounted thereon and provided at one side of its longitudinal center with a slot and at the opposite side of its center with a hopper surmounting the bottom, a shaft journaled under the bottom, a wheel mounted on a shaft and provided with an annular series of countersunk seed-cups and at one side thereof with a series of radiating spokes or arms, the cups being in the path of the opening in the bottom and the arms extending through the slot in said bottom, and the half-bottom, L-shaped in cross-section, reversibly mounted in the hopper, substantially as specified.

2. The combination with the framework, the bottom mounted thereon and provided at one side of its longitudinal center with a slot and at the opposite side of its center with an opening, a hopper surmounting the bottom, a half-bottom of inverted L-shape terminating at its ends in walls bent at an angle to the bottom, the inner edge of said half-bottom constituting a flange and taking between the cup and arm portion of the wheel, bolts passing through the end walls of the hopper and the end wall of the half-bottom, and the brush carrying a plate mounted on the front bolt, said brush contacting with the periphery of the wheel, substantially as specified.

3. The combination with the opposite parallel side-bars connected at their front and rear ends, the hopper supported thereon, and the handles bolted to the side-bars, of the spout depending from the hopper, the opposite standards secured to the side-bars and located at opposite sides of the spout, the shovel secured to the lower ends of the standards and located in front of the spout, and the inclined braces secured at their front ends to the standards and at their rear ends to those bolts connecting the handles and side-bars, substantially as specified.

In testimony that I claim the foregoing as my own I have hereto affixed my signature in the presence of two witnesses.

JAMES C. CAYTON.

Witnesses:
G. W. HEROD,
Z. T. DURHAM.